United States Patent
Zahn

[19]

[11] 3,828,411
[45] Aug. 13, 1974

[54] METHOD OF MAKING A FRICTIONAL CONNECTION BETWEEN AN ANTIFRICTION BEARING AND A SEALING RING

[75] Inventor: Günter Zahn, Hilden, Germany
[73] Assignee: Ziller & Co., Dusseldorf, Germany
[22] Filed: Mar. 6, 1973
[21] Appl. No.: 338,432

[52] U.S. Cl. ...... 29/148.4 S, 29/DIG. 34, 308/187.2
[51] Int. Cl. ........................ B23p 11/00, F16c 33/78
[58] Field of Search.. 29/148.4 S, 148.4 R, 148.4 A, 29/DIG. 34; 308/187.2

[56] References Cited
UNITED STATES PATENTS
3,586,404  6/1971  Zahn .............................. 308/187.2
3,715,147  2/1973  Zahn .............................. 308/187.2

Primary Examiner—Thomas H. Eager
Attorney, Agent, or Firm—Walter Becker

[57] ABSTRACT

A sealing ring structure and method of making same for an antifriction bearing. The sealing ring structure is composed of an outer sealing ring of substantially U-shaped cross section and the inner portion thereof is pressed upon a conical portion of the inner race ring of the antifriction bearing. The ceiling ring structure is furthermore composed of an inner sealing ring, preferably of rubber or synthetic material, which is firmly connected to the outer sealing ring and has a lip in frictional engagement with the bearing housing and the respective outer race ring of the antifriction bearing.

2 Claims, 2 Drawing Figures

PATENTED AUG 13 1974 3,828,411

METHOD OF MAKING A FRICTIONAL CONNECTION BETWEEN AN ANTIFRICTION BEARING AND A SEALING RING

The present invention relates to a method of making a frictional connection between an engaging surface, which extends in axial direction, serves for centering and engages either the outer circumference of the inner race ring or the inner circumference of the outer race ring of an antifriction bearing, and a sealing ring of substantially U-shaped cross section with cylindrical tightening surface which sealing ring has its sealing edge at a right angle resiliently engaging an end face of the respective other race ring of the antifriction bearing. The invention refers in particular to the method just described according to which the sealing ring of U-shaped cross section has its cylindrical tightening surface pressed in the direction toward the antifriction bearing against the conical engaging surface which has a conical angle that is smaller than the angle of friction (according to U.S. Pat. Nos. 3,586,404 or 3,715,147). The sealing rings employed for this purpose are usually made of metallic material and are called resilient cover discs.

U.S. Pat. No. 3,586,404 describes a method for a frictional arrangement according to the above referred to features for sealing in connection with a conical roller bearing in which a total of two U-shaped sealing rings arranged one within the other are employed which form a common cylindrical tightening surface and which in conformity with the described method are slipped onto a conical engaging surface.

A sealing ring of this type is thus composed of two independent parts while each part is resilient by itself and is able when carrying out the method as well as later in operation to deform elastically or plastically. From a purely functional standpoint the two individual sealing rings, henceforth designated as inner and outer sealing rings, are exposed to different deformations. The inner sealing ring has to bridge the tolerances of the total bearing width as well as the tolerance of the width of the outer race ring of the bearing. The outer sealing ring, on the other hand, has to bridge only the tolerance of width of the total bearing width. Since, however, particularly when conical roller bearings are involved, the tolerance of width of the outer race ring of an average of 0.3 mm is considerable, it is necessary that the sealing edge of the inner sealing ring often bridges a considerable total tolerance.

In addition thereto it may be mentioned that the two individual metallic sealing rings which form the U-shaped sealing ring of U.S. Pat. No. 3,586,404, in spite of their identical design, are subjected to different problems. The outer sealing ring is intended to protect the bearing against impurifications from the outside, whereas the inner sealing ring is intended to serve as seal proper to prevent the escape of grease from the antifriction bearing. Both sealing rings, following a certain running-in period, are supposed to produce a running-in groove in the opposite surface so that they will operate practically contact-free.

However, experience has shown that the connection of sealing rings according to U.S. Pat. No. 3,586,404, which sealing rings comprise two individual metallic sealing rings, has certain drawbacks inasmuch as the two individual rigid sealing rings do not uniformly engage the respective parts. As a result thereof, the sealing problems, which in particular with vehicle axles become more and more difficult, cannot always be properly solved. This is due primarily to the fact that during the assembly of the sealing rings, especially on an assembly line, the diligence for mastering the required narrow tolerances is not always assured. On the other hand, already a minor escape of grease will result in a fouling of the brakes, while the ever increasing speeds and the mass forces to be braked resulting therefrom bring about ever increasing temperatures of the bearing areas with which the heretofore known sealing rings are unable to cope. As a result thereof, spray water mixed with street dirt or salt will enter the bearing and will render the bearing useless.

It is, therefore, an object of the present invention to provide a method for making a frictional connection between an axial engaging surface at the outer circumference of the inner race ring and the inner circumference of the outer race ring and a sealing ring of U-shaped cross section with cylindrical tightening surface, and also to provide a device for use in connection with this method, according to which, after the U-shaped sealing ring has been pressed upon a conical engaging surface, an inner sealing ring designed as sealing lip and located within an outer sealing ring simultaneously engages the end face of the respective other race ring and the cylindrical surface of the housing.

A special feature of the method according to the invention consists in that the sealing ring according to the invention is prior to the assembly of the antifriction bearing pressed against the conical engaging surface, while the inner sealing ring designed as sealing lip in non-assembled condition has a shorter outer diameter than the diameter of the outer race ring. Only after the assembly of the two race rings, is the inner sealing ring by elastic deformation arranged on the end face of the other race ring and in engagement with the cylindrical surface of the housing.

For use in connection with the present invention there is employed a substantially U-shaped sealing ring with cylindrical clamping surface which is formed of two individual sealing rings of different materials. The inner sealing ring designed as sealing lip of the U-shaped sealing ring has its outer rim provided with a substantially roof-shaped reinforcement. The inner sealing ring may consist of rubber or of oil-resistant synthetic material, while both materials may be so selected that they will also be able to withstand higher temperatures. If desired, such sealing ring may also be reinforced by an inserted star-shaped spring.

The inner sealing ring may be connected to the outer sealing ring by vulcanization, gluing, riveting or any other suitable connecting means. When vulcanizing the inner sealing ring or when making the inner sealing ring of synthetic material, it is also possible to provide the inner surface of the outer sealing ring completely with a thin layer of the respective material so that in this way a particularly good connection between the inner and outer sealing rings will be assured. Finally, it is also possible to provide the outer sealing ring at its straight back with a circular bead in order, on the one hand, to reinforce the sealing ring and, on the other hand, to bring about a good support at the area where the inner sealing ring angles off.

The invention is illustrated by way of example in the accompanying drawing, in which.

Figure 1:
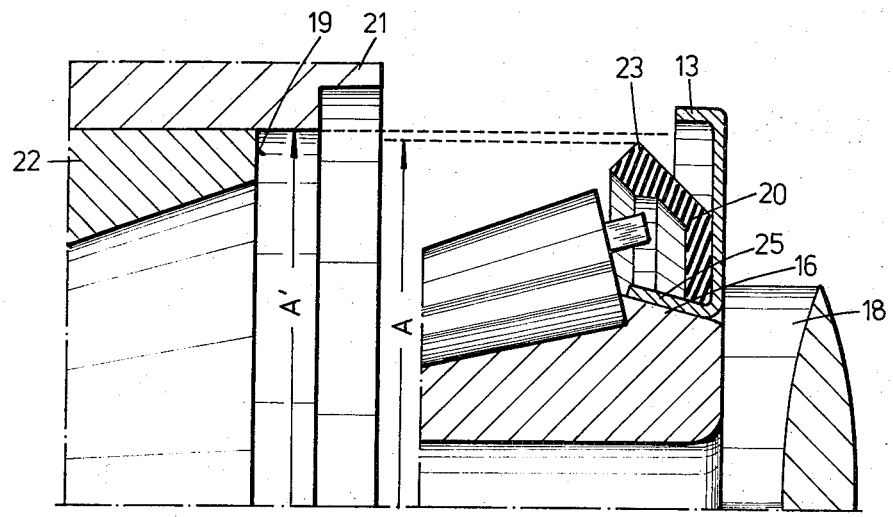
FIG. 1 illustrates a sealing ring according to the invention prior to the assembly of the antifriction bearing.

Referring now to the drawing in detail, it will be appreciated that in conformity with the method described in U.S. Pat. No. 3,586,404, the seal comprising an outer and an inner sealing ring is with its common cylindrical clamping surface in the direction toward the antifriction bearing pressed onto a conical engaging surface, while the engaging surface has a conical angle which is less than the angle of friction.

For carrying out the method according to the present invention, there has been employed a sealing ring 20 of rubber, synthetic material, or the like, which sealing ring forms a sealing lip. The inner sealing ring 20 has an outer diameter A which is less than the outer diameter A' of the outer antifriction bearing ring 21. Only after the two bearing rings or race rings have been assembled, by elastic deformation of the inner sealing ring 20, there is effected the engagement of the above mentioned sealing ring with the end face 19 of the outer race ring 22 as well as with the cylindrical inner surface 22a of housing 21 (FIG. 2).

For practicing the method according to the invention, FIG. 1 shows an inner sealing ring 20 designed as sealing lip which sealing ring 20 has its outer rim provided with a substantially roofshaped reinforcement 23. Whereas the outer sealing ring 13, as is the case with U.S. Pat. No. 3,586,404, consists of metal, the inner sealing ring 20 consists of rubber, synthetic material, or any other oil-resistant material. This inner sealing ring 20 has the outer sealing ring 13 connected thereto either by vulcanization, gluing, riveting, or any other convenient method.

Figure 2:
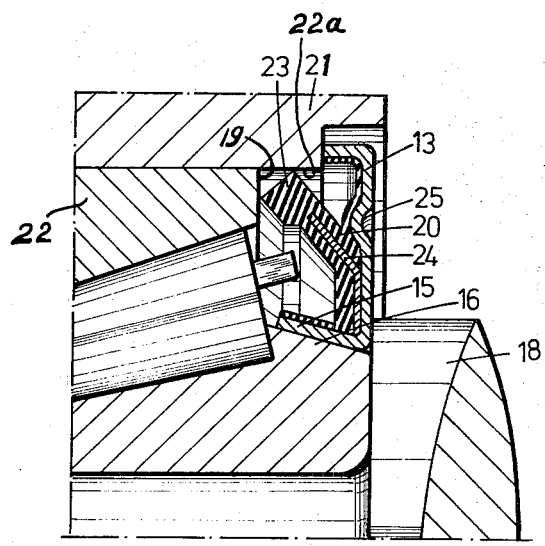
FIG. 2 illustrates a sealing ring similar to that of FIG. 1 in its operative position.

FIG. 2 shows a sealing ring installed in conformity with the method of the invention. This sealing ring is again composed of the outer sealing ring 13 and the inner sealing ring 20. The outer sealing ring 13 is reinforced at its straight back by means of a circular bead 25. The inner sealing ring 20 is by vulcanization or cementing connected to the inner side of ring 13, and at the same time the entire inner surface of the outer antifriction bearing ring is provided with a layer of the same material as the sealing ring. As a result thereof, a particularly good and intimate connection is established between the parts forming the inner sealing ring, and a good support is obtained with regard to the bead 25. In order still further to reinforce such sealing ring, a star-shaped spring 24 may be inserted in the sealing ring. To this end, expediently the star-shaped spring 24 is firmly connected to the outer sealing ring 13 in order to be able to form the inner sealing ring 20 together with the above referred to thin layer of the same material.

In both instances the metallic outer sealing ring 13 will at its clamping surface 15 form the necessary frictional connection with regard to the engaging surface 16, and by means of the shaft step 18 forming an engaging shoulder is, following the pressing-on step, additionally secured against loosening in axial direction.

In conformity with the method of the present invention, a sealing ring may also be arranged on antifriction bearings with high axial tolerances while nevertheless a safe engagement of the two sealing rings consisting of different materials will be obtained. In this way, when centrally introducing the sealing ring pressed onto the antifriction bearing ring, it is possible even when assembling larger series to assure a safe engagement of the elastic inner sealing ring which engagement is not controllable from the outside.

It is, of course, to be understood that the present invention is not only applicable to such types of antifriction bearings in which the outer ring is separated from the inner ring. It is merely essential that the assembly of such bearings can be carried out only after the sealing ring has been pressed on.

It is also to be understood that the present invention is, by no means, limited to the particular showing in the drawing but also comprises any modifications within the scope of the appended claims.

What I claim is:

1. In connection with an antifriction bearing having a housing, an inner race ring with a conical engagement surface and an outer race ring surrounded by said housing, the method of establishing a frictional connection between a sealing ring of substantially U-shaped cross section having a cylindrical clamping surface with the outer circumference of the inner race ring and an inner circumferential surface of the outer race ring, which includes the steps of: pressing the cylindrical clamping surface of the sealing ring in the direction toward the antifriction bearing upon the conical engaging surface of the inner race ring, said conical engaging surface having a conical angle less than the angle of friction, and subsequently providing an inner sealing ring at least partially within the first mentioned sealing ring and forcing the same into frictional engagement simultaneously with the cylindrical surface of the housing and with the end face of the other antifriction bearing race ring.

2. A method according to claim 1, in which the sealing ring is installed prior to the complete assembly of the antifriction bearing while the inner sealing ring has first a smaller diameter than the outer race ring, and subsequently bringing said inner sealing ring into engagement with the respective surfaces of the race rings after complete assembly of the two race rings.

* * * * *

UNITED STATES PATENT OFFICE
CERTIFICATE OF CORRECTION

Patent No. 3,828,411    Dated August 13, 1974

Inventor(s) Günter Zahn

It is certified that error appears in the above-identified patent and that said Letters Patent are hereby corrected as shown below:

Add:
[30] Foreign Application Priority Data

March 7, 1972, Federal Republic of Germany..2210888

Signed and Sealed this

Nineteenth Day of December 1978

[SEAL]

Attest:

RUTH C. MASON
Attesting Officer

DONALD W. BANNER
Commissioner of Patents and Trademarks